United States Patent [19]

Fils

[11] 3,904,123
[45] Sept. 9, 1975

[54] WATERPROOFING APPARATUS

[76] Inventor: Sidney Fils, 6 Flint Ln., Jericho, N.Y. 11753

[22] Filed: July 18, 1973

[21] Appl. No.: 380,495

[52] U.S. Cl. .................. 239/271; 52/169; 239/288
[51] Int. Cl.$^2$ .......................................... B05B 1/28
[58] Field of Search .......... 239/271, 272, 276, 288, 239/288.3, 288.5; 52/169; 61/13; 137/379

[56] References Cited
UNITED STATES PATENTS

| | | | |
|---|---|---|---|
| 551,527 | 12/1895 | Cunningham | 239/271 |
| 2,505,174 | 4/1950 | Daniels | 239/271 X |
| 2,898,759 | 8/1959 | Pebley | 52/169 X |
| 2,928,610 | 3/1960 | Fenimore | 239/288.5 |
| 2,993,650 | 7/1961 | Badberg | 239/271 |
| 3,770,204 | 11/1973 | Schuster | 239/288.5 |

FOREIGN PATENTS OR APPLICATIONS

| 524,070 | 4/1955 | Italy | 239/271 |
|---|---|---|---|

*Primary Examiner*—M. Henson Wood, Jr.
*Assistant Examiner*—Andres Kashnikow
*Attorney, Agent, or Firm*—Carlos Nieves

[57] ABSTRACT

Apparatus for injecting a waterproofing fluid, provided by a pump, into the ground includes a pipe having an open end, a closed end having a conical outer surface, and a plurality of spaced holes adjacent the closed end. The open end of the pipe is coupled by a shut off valve to the intersecting member of a T-shaped pipe fitting. One end of the intersected member of the fitting is closed and the other end is coupled to the pump. Thus, the fitting serves as a handle for driving the pipe into the ground and in combination with the valve serves to supply fluid under pressure to the pipe for distribution via the holes. The apparatus also includes a rubber member having a tubular section which flares out into a cup-shaped section. The tubular section is slidably coupled to the outside of the pipe with the cup-shaped section extending from the tubular section towards the closed end of the pipe, and a clamp releasably secures the tubular section to a part of the pipe, thereby providing a fluid tight seal between the pipe and the tubular section. When the closed end of the pipe is driven into the ground, such that the cup-shaped section is inverted and pressed against the top of the ground, a backup pressure is created which forces the fluid flowing from the holes to spread into the ground surrounding the pipe.

10 Claims, 5 Drawing Figures

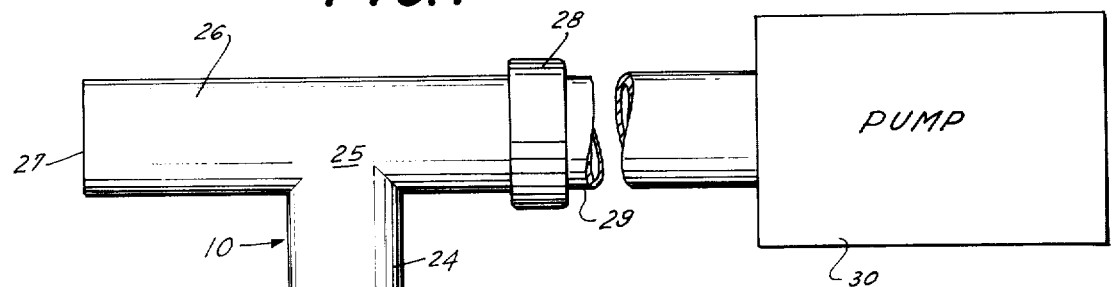
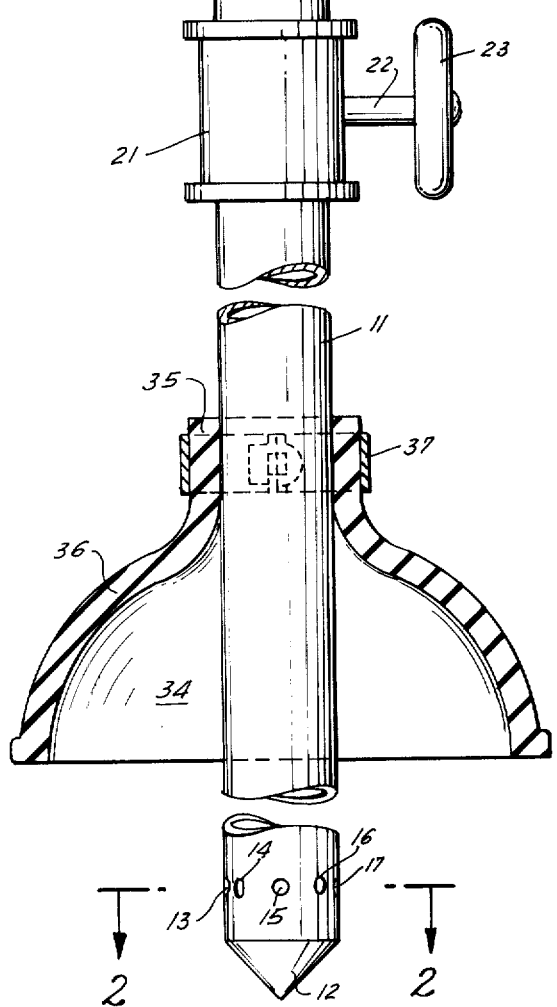
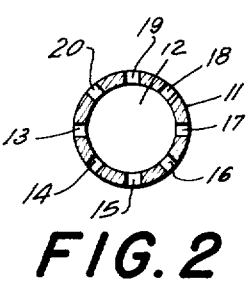
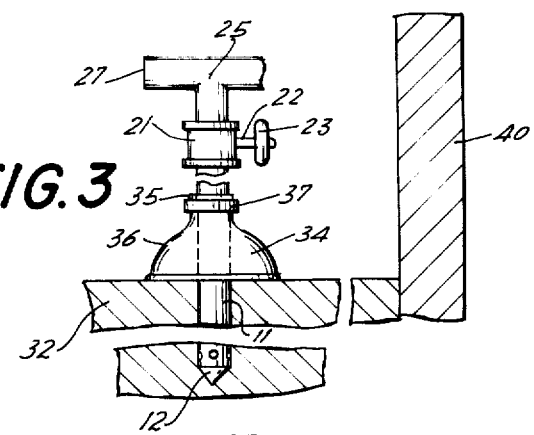
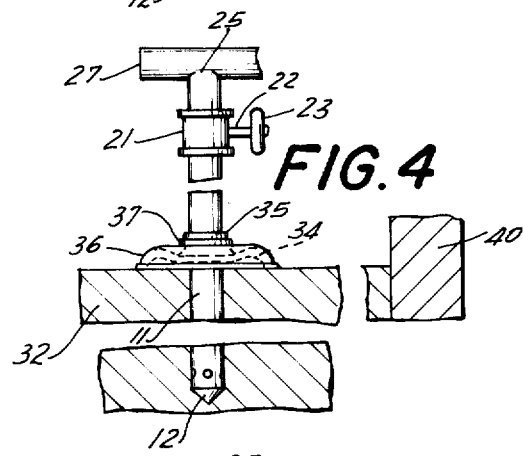
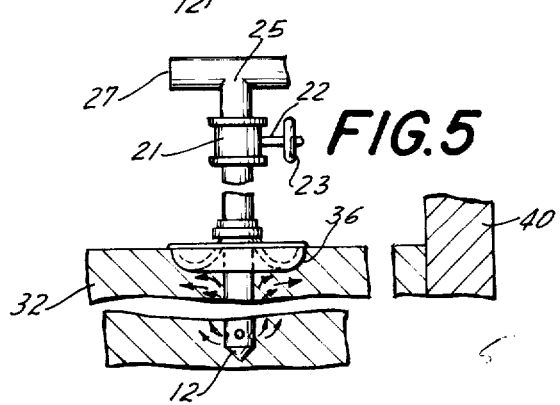

WATERPROOFING APPARATUS

The subject invention relates to apparatus for injecting fluids into the ground.

It is known that solutions of sodium bentonite may be injected into the ground surrounding the basement walls of a building to seal cracks in the walls and to provide a shield around the walls which tends to prevent water and moisture from passing to the inside of the building. Typically, the solution is injected into the ground with a pipe having a closed end, a plurality of holes spaced along its length, and an open end which is connected to a pump. The pump is used to force the solution out through the holes after the closed end of the pipe has been driven into the ground. To waterproof a length of wall spaced injections along the length of the wall are required. However, this method of waterproofing is inefficient because as the pipe is driven into the ground a cylindrical space between the pipe and ground is provided which offers little resistance to the solution flowing from the holes in the pipe. As a result, although some solution is injected into the ground, most of the solution rises to the top surface of the ground and, in effect, is wasted. Further, because of the low resistance path the radius of impregnation around the pipe is small and many closely spaced injections are required to properly waterproof a length of wall. Thus, it may be seen that this method of waterproofing is wasteful of both mateials and labor.

It is an object of this invention to provide improved apparatus for injecting a fluid into the ground.

In summary, the invention provides apparatus for injecting a fluid provided by pump, which comprises: (a) a pipe having an open end, a closed end, and a plurality of spaced holes adjacent the closed end; (b) means for coupling the open end of the pipe to the pump; (c) a flexible member having a tubular section which flares out into a cup-shaped section, said tubular section being slidably coupled to the outside of the pipe with the cup-shaped section extending from the tubular section towards the closed end of the pipe; and (d) means for selectively clamping the tubular section to a part of the pipe, thereby providing a fluid tight seal between the pipe and the tubular section. With this structure when the closed end of the pipe is driven into the ground such that the cup-shaped section is inverted and pressed against the top of the ground and fluid is pumped, a backup pressure is created which forces the fluid flowing from the holes to impregnate the ground around the pipe. Moreover, it should be noted that the position of the flexible member on the pipe may be varied to permit selectable depths of penetration with the pipe.

The foregoing and other objects and features of the invention are incorporated in the example now to be described with reference to the accompanying drawings, in which:

FIG. 1 is a drawing of a system for pumping fluid which includes apparatus according to the invention, part of the apparatus being shown in cross-section;

FIG. 2 is a cross-sectional view of the apparatus, taken along line 2—2 in FIG. 1; and FIGS. 3–5 are partial side plan views which when viewed sequentially, illustrate the partial insertion of the apparatus into the ground adjacent a building wall.

Referring to FIG. 1, apparatus 10, according to the invention, includes a pipe 11 having a closed end 12 whose outside surface is conically shaped. Adjacent the closed end 12 the pipe includes eight equally spaced fluid discharge holes 13–20 (see FIG. 2), the axes of the holes lying radially in an imaginary plane perpendicular to the axis of the pipe. At its other end pipe 11 is threadably connected to the discharge end of a shut-off valve 21 having the usual stem 22 and handwheel 23 for opening and closing the valve. The inlet end of shut-off valve 21 is threadably connected to the intersecting member 24 of a T-shaped fitting 25. The intersected member 26 of the fitting is closed at one end 27 and the other end is connected by a fluid tight coupling 28 to a conduit 29. Conduit 29 is connected to a pump 30 which is capable of supplying under pressure, for example, a solution of sodium bentonite. With this arrangement, the fitting 25 may be used as a handle to drive the closed end 12 and part of the pipe 11 into the ground 32 (see FIGS. 3–5) and valve 21 may be used to control the flow of sodium bentonite through the holes 13–20.

Pipe 11 slidably supports a flexible member 34 having a tubular section 35 which flares out into a cup-shaped section 36. Member 34 may be manufactured, for example, by modifying a rubber plunger such as is used to free stuffed pipes, the modification consisting of extending the hole in the plunger which is used to support the plunger's handle through to the cavity provided to the plunger's cup. Tubular section 35 is slidably coupled to the pipe 11 such that the cup section 36 extends towards the closed end 12 and a clamp 37 is used to releasably secure the tubular section to selectable parts of the pipe 11. When the tubular section 35 is clamped to the pipe a fluid tight seal is provided between the tubular section 35 and pipe 11.

Referring to FIGS. 3–5, when the apparatus is to be used to inject, for example, a sodium bentonite solution into the ground 32 adjacent a wall 40, the distance between the holes 13–20 and the clamped tubular section is set to be slightly larger than the desired injection depth. Thereafter, the pipe 11 is vertically driven into the ground until the cup section 36 is flexed into an inverted position (see FIG. 5) and pressure is being exerted by the cup-section 36 against the ground. Subsequently, the valve 21 is opened and sodium bentonite flows from the holes 13–20 into the ground 32 surrounding the holes 13–20 in the pipe 11. There is a tendency for the injected solution to flow upwardly in a space between the pipe 11 and ground 32 which is created when the pipe is inserted. However, this space is closed off near the surface of the ground by the pressure exerted by the cup-shaped section 36. Therefore, as the fluid rises through the space a backup pressure is created which causes the solution to impregnate the ground 32 around the pipe. With the process described a fairly uniform distribution of solution may be provided over a range of pump pressures. However, it should be noted that several injection depths may be used to control the distribution of solution by changing the position of the clamped tubular section 35 on the pipe 11.

From the foregoing it may be noted that the conical surface of the closed end 12 functions as a wedge and that other wedge shapes may be used as substitutes. Moreover, it should be noted that the valve 21 is readily available for use by an operator of the apparatus but that it could, if desired, be located elsewhere. Lastly, the reader's attention is drawn to the fact that the T-shaped fitting may be dispensed with if other means are available for driving the pipe into the ground.

In view of the above, it is to be understood that the description herein of a preferred embodiment according to the invention is set forth as an example thereof and is not to be construed or interpreted as a limitation on the claims which follow and define the invention.

What is claimed is:

1. Apparatus for injecting a fluid provided by a pump into the ground, comprising:
   a. an elongated pipe having an open end, a closed end, and a plurality of spaced holes adjacent the closed end;
   b. means for coupling the open end of the pipe to the pump;
   c. a flexible member having a tubular section which flares out into a cup-shaped section, said tubular section being slidably coupled to the outside of the pipe with the cup-shaped section extending from the tubular section towards the closed end of the pipe; and
   d. means for selectively clamping the tubular section to a part of the pipe such that the flexible member is located between the open end and the spaced holes, the clamping means providing a fluid tight seal between the pipe and the tubular section, and such that when the closed end of the pipe is inserted into the ground and the cup-shaped section is biased against the ground, the section flexes and an annular inner surface of the section presses against the ground surface around the pipe.

2. Apparatus as defined in claim 1 wherein the axes of said holes lie in an imaginary plane perpendicular to the axis of the pipe.

3. Apparatus as defined in claim 2 wherein said plurality of holes includes at least six holes.

4. Apparatus as defined in claim 1 wherein the outside surface of the closed end includes at least one wedge shaped area.

5. Apparatus as defined in claim 1 wherein the outside surface of the closed end is conical.

6. Apparatus as defined in claim 1, further including a handle coupled to the pipe.

7. Apparatus as defined in claim 1 wherein said means for coupling the open end of the pipe to the pump includes a T-shaped pipe fitting, one end of the intersected member of the pipe fitting being closed; means for coupling the other end of the intersected member to the pump; and means for coupling the unconnected end of the intersecting member of the fitting to the open end of the pipe, whereby the fitting serves as a conduit for the fluid and as a handle for driving the pipe into the ground.

8. Apparatus as defined in claim 7 wherein said means for coupling the intersecting member to the pipe includes a shut-off valve.

9. Apparatus as defined in claim 8 wherein the axes of said holes lie in an imaginary plane perpendicular to the axis of the pipe and wherein the outside surface of the closed end is conical.

10. Apparatus as defined in claim 9 wherein the flexible member is formed from rubber.

* * * * *